United States Patent [19]
Tsuchida et al.

[11] Patent Number: 5,184,251
[45] Date of Patent: Feb. 2, 1993

[54] VARI-FOCAL LENS SYSTEM

[75] Inventors: Hirofumi Tsuchida; Norihiko Aoki, both of Tokyo, Japan

[73] Assignee: Olympus Optical Co., Ltd., Tokyo, Japan

[21] Appl. No.: 697,442

[22] Filed: May 9, 1991

[30] Foreign Application Priority Data

May 9, 1990 [JP] Japan .................... 2-117729

[51] Int. Cl.$^5$ .................. G02B 13/18; G02B 15/14
[52] U.S. Cl. ............................ 359/654; 359/686; 359/708; 359/782
[58] Field of Search ........... 359/644, 652, 654, 771, 359/782, 676, 680, 683, 708, 686

[56] References Cited

U.S. PATENT DOCUMENTS

| | | | |
|---|---|---|---|
| 4,776,679 | 10/1988 | Kitagishi et al. | 359/564 |
| 4,812,021 | 3/1989 | Harrigan | 359/679 |
| 4,830,476 | 5/1989 | Aoki | 359/654 |
| 5,117,308 | 5/1992 | Tsuchida et al. | 359/654 |
| 5,117,309 | 5/1992 | Aoki | 359/654 |

OTHER PUBLICATIONS

*Applied Optics,* vol. 21, Mar. 15, 1982, "Design of a gradient-index photographic objective" L. G. Atkinson et al. pp. 993–998.

Primary Examiner—Bruce Y. Arnold
Assistant Examiner—James Phan
Attorney, Agent, or Firm—Cushman, Darby & Cushman

[57] ABSTRACT

A vari-focal lens system including, in the order from the object side, a first lens unit having a negative refractive power, a second lens unit having a positive refractive power, an aperture stop, a third lens unit having a positive refractive power and a fourth lens unit having a negative refractive power; and using at least one radial GRIN lens element on each side of the aperture stop. This vari-focal lens system has only a very small number of lens elements and had favorably corrected aberrations.

8 Claims, 11 Drawing Sheets

VARI-FOCAL LENS SYSTEM

BACKGROUND OF THE INVENTION a) Field of the invention:

The present invention relates to a vari-focal lens system which is to be used with cameras and so on.

b) Description of the prior art:

It has recently become common to use zoom lens systems as photographic lens systems for silver salt photographic cameras, video cameras and so on. These zoom lens systems have a common defect; they require a large of lens elements for correcting aberrations and have large external dimensions.

In order to correct this defect, aspherical lens elements are used. However, it is impossible to remarkably reduce the number of lens elements by the use of aspherical lens elements since aspherical surfaces are ineffective for correcting chromatic aberration though they can correct spherical aberration, coma, distortion, etc.

A vari-focal lens system consists of a plurality of lens units, in each of which chromatic aberration must be corrected. For this reason, each lens unit must comprise at least two lens elements, i.e., a positive lens element and a negative lens element even when aspherical surfaces are used in the lens unit.

Figure 1:
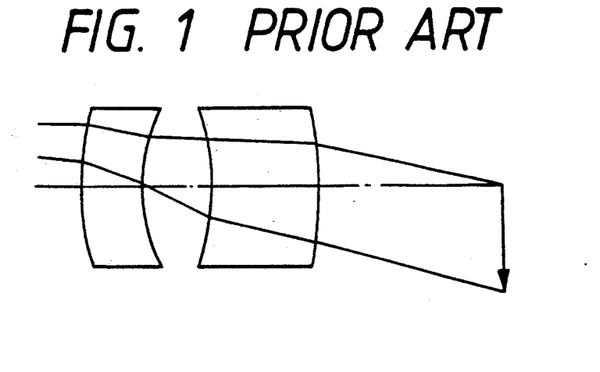
FIG. 1 shows a sectional view illustrating the composition of the conventional vari-focal lens system using radial GRIN lens elements.

There are used in these days graded refractive index lens elements (GRIN lens elements) which have refractive indices varying between portions thereof. The use of the GRIN lens elements makes it possible to correct spherical aberration, etc. like use of the aspherical lens elements, and at the same time to correct curvature of field and chromatic aberration. A lens system which has a fixed focal length and comprises GRIN lens elements is reported on pages 993 and later in Applied Optics, Vol. 21. This lens system favorably corrects aberrations with two radial GRIN lens elements having the shapes of concave lens elements, made of media having positive refractive powers and arranged concentrically with an aperture stop as shown in FIG. 1, and is composed of lens elements in a number smaller than half the number of the lens elements used in the conventional lens system.

Further, as an example of vari-focal lens systems using GRIN lens elements, there is known the lens system disclosed by U.S. Pat. No. 4,776,679. However, a remarkable reduction of the number of lens elements is not made in this vari-focal lens system.

SUMMARY OF THE INVENTION

A primary object of the present invention is to provide a vari-focal lens system which is to be used with cameras, etc., and comprises lens elements in a remarkably reduced number.

The vari-focal lens system according to the present invention comprises, in the order from the object side, a first lens unit having a negative refractive power, a second lens unit having a positive refractive power, an aperture stop, a third lens unit having a positive refractive power and a fourth lens unit having a negative refractive power, and is characterized in that it uses at least one radial GRIN lens element on each side of the aperture stop.

When the distance as measured from the optical axis to a lens portion of interest in the direction perpendicular to the optical axis is represented by y, the refractive index of the portion located at the radial distance y is designated by n(y), the refractive index as measured on the lens portion located on the optical axis is denoted by $N_O$, and the refractive index distribution coefficients are represented by $N_1, N_2, N_3, \ldots$, the refractive index distribution of the radial GRIN lens element is expressed by the following formula:

$$n(y) = N_O + N_1 y^2 + N_2 y^4 + N_3 y^6 + \ldots$$

According to the above-mentioned literature, aberrations are corrected as described below in the lens system which has the fixed focal length and is composed of the two radial GRIN lens elements.

Aberrations are classified into seven kinds, i.e., Seidel's five aberrations, longitudinal chromatic aberration and lateral chromatic aberration. Out of these aberrations, the curvature of field is corrected by designing the radial GRIN lens elements so as to have the concave shapes (shapes thicker at the marginal portions than at the portions on the optical axis) and selecting media having the positive refractive powers, the spherical aberration is corrected by adequately selecting the refractive index distribution coefficients of the second and higher orders ($N_2, N_3, \ldots$), and the longitudinal chromatic aberration is corrected by selecting an adequate distribution of dispersion. Further, the astigmatism is corrected by reserving an adequate airspace between each of the radial GRIN lens elements and the aperture stop, whereas the other aberrations, i.e., coma, distortion and lateral chromatic aberration, are corrected by composing the lens system so as to be symmetrical with regard to the aperture stop so that the aberrations produced before the aperture stop are cancelled with those produced after the aperture stop.

As is understood from the foregoing description, the radial GRIN lens elements are excellent in their capability to correct the curvature of field, spherical aberration and longitudinal chromatic aberration element, to correct not only these aberrations but also coma, distortion, etc. at the same time.

The vari-focal lens system of the type which consists of two lens units has a fundamental composition of a combination of a negative lens unit and a positive lens unit i.e., an asymmetrical power distribution. Therefore, it is difficult for the vari-focal lens system, unlike the above-described lens system having the fixed focal length, to select a composition symmetrical with regard to an aperture stop so that coma, distortion and lateral chromatic aberration will be cancelled. In other words, when the conventional zoom lens system is composed of two lens units each of which consists of a single radial GRIN lens element, the curvature of field, spherical aberration and longitudinal chromatic aberration can be corrected owing to the above-described characteristics of the radial GRIN lens element, but coma, distortion, etc. can hardly be corrected.

The present invention has succeeded in favorably correcting the distortion and lateral chromatic aberration, which could hardly be corrected in the vari-focal lens system having an asymmetrical power distribution, by adopting a lens type which has scarcely known symmetrical power distribution and applying radial GRIN lens elements to this lens type.

For a vari-focal lens system which has a symmetrical power distribution and a simple composition, it is conceivable to select a lens type which consists of a negative lens unit, a positive lens unit, an aperture stop, a positive lens unit and a negative lens unit, or a positive lens unit, a negative lens unit, an aperture stop, a negative lens unit and a positive lens unit.

The present invention has selected the lens type having the negative-positive- positive-negative power distribution which is suited for widening field angle of the vari-focal lens system.

For applying the radial GRIN lens element to the vari-focal lens system having the negative-positive-positive-negative power distribution, it is desirable to use at least two radial GRIN lens elements. Especially for correcting the coma, distortion and lateral chromatic aberration, it is preferable to arrange a radial GRIN lens element in each of the first lens unit and the fourth lens unit, or in each of the second lens unit and the third lens unit so that the radial GRIN lens elements are arranged symmetrically with regard to the aperture stop. When the radial GRIN lens elements are arranged as described above, it is possible to correct favorably all the aberrations since the two radial GRIN lens elements function to cancel the coma, distortion and lateral chromatic aberration.

Especially by composing each of the lens unit of a single radial GRIN lens element, it is possible to compose the vari-focal lens system as a whole from as few as four lens elements.

DETAILED DESCRIPTION OF THE PREFERRED EMBODIMENTS

Now, the vari-focal lens system according to the present invention will be described more detail below with reference to the preferred embodiments illustrated in the accompanying drawings and given in the form of the following numerical data:

Embodiment 1

$f = 35 \sim 70$, $F/4.0 \sim F/5.6$,
maximum image height 21.6
field angle $2\omega = 63.2° \sim 34.6°$ $r_1 = 51.0646$
$\quad d_1 = 12.0135 \quad n_1$ (GRIN lens $G_1$)
$r_2 = 37.5154$
$\quad d_2 = D_1$ (variable)
$r_3 = 61.2236$
$\quad d_3 = 10.6035 \quad n_2$ (GRIN lens $G_2$)
$r_4 = 43.4140$
$\quad d_4 = 5.8309$
$r_5 = \infty$ (stop)
$\quad d_5 = 9.0630$
$r_6 = -27.8354$
$\quad d_6 = 9.5227 \quad n_3$ (GRIN lens $G_3$)
$r_7 = -40.8510$
$\quad d_7 = D_2$ (variable)
$r_8 = -118.2188$
$\quad d_8 = 11.8904 \quad n_4$ (GRIN lens $G_4$)
$r_9 = -90.4256$

| f | 35 | 50 | 70 |
|---|---|---|---|
| $D_1$ | 23.975 | 9.757 | 2.000 |
| $D_2$ | 23.543 | 12.735 | 1.000 |

| | GRIN lens | | |
|---|---|---|---|
| | | $N_0$ | $N_1$ |
| $G_1$ | d line | 1.64769 | $0.39413 \times 10^{-3}$ |
| | C line | 1.64209 | $0.39440 \times 10^{-3}$ |
| | F line | 1.66125 | $0.39350 \times 10^{-3}$ |
| | | $N_2$ | |
| | d line | $-0.94716 \times 10^{-7}$ | |
| | C line | $-0.94716 \times 10^{-7}$ | |
| | F line | $-0.94716 \times 10^{-7}$ | |
| | | $N_0$ | $N_1$ |
| $G_2$ | d line | 1.72000 | $-0.83644 \times 10^{-3}$ |
| | C line | 1.71568 | $-0.83391 \times 10^{-3}$ |
| | F line | 1.73001 | $-0.84233 \times 10^{-3}$ |
| | | $N_2$ | |
| | d line | $0.59123 \times 10^{-6}$ | |
| | C line | $0.59123 \times 10^{-6}$ | |
| | F line | $0.59123 \times 10^{-6}$ | |
| | | $N_0$ | $N_1$ |
| $G_3$ | d line | 1.72000 | $-0.17112 \times 10^{-2}$ |
| | C line | 1.71568 | $-0.17093 \times 10^{-2}$ |
| | F line | 1.73001 | $-0.17156 \times 10^{-2}$ |
| | | $N_2$ | |
| | d line | $0.65807 \times 10^{-6}$ | |
| | C line | $0.65807 \times 10^{-6}$ | |
| | F line | $0.65807 \times 10^{-6}$ | |
| | | $N_0$ | $N_1$ |
| $G_4$ | d line | 1.64769 | $0.53381 \times 10^{-3}$ |
| | C line | 1.64209 | $0.53381 \times 10^{-3}$ |
| | F line | 1.66125 | $0.53381 \times 10^{-3}$ |
| | | $N_2$ | |
| | d line | $-0.26662 \times 10^{-6}$ | |
| | C line | $-0.26662 \times 10^{-6}$ | |
| | F line | $-0.26662 \times 10^{-6}$ | |

Embodiment 2

$f = 38 \sim 105$, $F/4 \sim F/6.7$
maximum image height 21.6
field angle $2\omega = 60.3° \sim 23.3°$ $r_1 = 86.9149$
$\quad d_1 = 9.5118 \quad n_1$ (GRIN lens $G_1$)
$r_2 = 54.2920$
$\quad d_2 = D_1$ (variable)
$r_3 = 76.7109$
$\quad d_3 = 9.1037 \quad n_2$(GRIN lens $G_2$)
$r_4 = 119.0822$
$\quad d_4 = D_2$ (variable)
$r_5 = \infty$ (stop)
$\quad d_5 = D_3$ (variable)

-continued

Embodiment 2

$r_6 = -34.1230$
$d_6 = 10.9455$   $n_3$ (GRIN lens $G_3$)
$r_7 = -61.6619$
$d_7 = D_4$ (variable)
$r_8 = -683.7368$
$d_8 = 6.7358$   $n_4$ (GRIN lens $G_4$)
$r_9 = -401.5592$

| f | 38 | 60 | 105 |
|---|---|---|---|
| $D_1$ | 26.148 | 9.987 | 1.607 |
| $D_2$ | 8.958 | 8.115 | 2.104 |
| $D_3$ | 10.838 | 11.760 | 7.766 |
| $D_4$ | 24.358 | 12.085 | 0.500 |

GRIN lens

| | | $N_0$ | $N_1$ |
|---|---|---|---|
| $G_1$ | d line | 1.65160 | $0.13932 \times 10^{-3}$ |
| | C line | 1.64821 | $0.13982 \times 10^{-3}$ |
| | F line | 1.65934 | $0.13813 \times 10^{-3}$ |
| | | | $N_2$ |
| | d line | | $-0.98024 \times 10^{-7}$ |
| | C line | | $-0.97995 \times 10^{-7}$ |
| | F line | | $-0.98093 \times 10^{-7}$ |
| | | $N_0$ | $N_1$ |
| $G_2$ | d line | 1.72000 | $-0.17244 \times 10^{-3}$ |
| | C line | 1.71568 | $-0.17199 \times 10^{-3}$ |
| | F line | 1.73001 | $-0.17348 \times 10^{-3}$ |
| | | | $N_2$ |
| | d line | | $0.68693 \times 10^{-6}$ |
| | C line | | $0.68672 \times 10^{-6}$ |
| | F line | | $0.68741 \times 10^{-6}$ |
| | | $N_0$ | $N_1$ |
| $G_3$ | d line | 1.72000 | $-0.16702 \times 10^{-2}$ |
| | C line | 1.71568 | $-0.16686 \times 10^{-2}$ |
| | F line | 1.73001 | $-0.16739 \times 10^{-2}$ |
| | | | $N_2$ |
| | d line | | $0.67145 \times 10^{-6}$ |
| | C line | | $0.67125 \times 10^{-6}$ |
| | F line | | $0.67192 \times 10^{-6}$ |
| | | $N_0$ | $N_1$ |
| $G_4$ | d line | 1.65160 | $0.14453 \times 10^{-2}$ |
| | C line | 1.64821 | $0.14453 \times 10^{-2}$ |
| | F line | 1.65934 | $0.14453 \times 10^{-2}$ |
| | | | $N_2$ |
| | d line | | $-0.27113 \times 10^{-6}$ |
| | C line | | $-0.27105 \times 10^{-6}$ |
| | F line | | $-0.27132 \times 10^{-6}$ |

Embodiment 3

$f = 50 \sim 100$, $F/4 \sim F/6.4$
maximum image height 21.6
field angle $2\omega = 47.5° \sim 24.2°$ $r_1 = 57.5893$
$d_1 = 2.0000$   $n_1 = 1.81600$   $\nu_1 = 46.62$
$r_2 = 20.6799$
$d_2 = 4.7631$
$r_3 = 24.7601$
$d_3 = 5.4000$   $n_2 = 1.67270$   $\nu_2 = 32.10$
$r_4 = 44.6225$ (aspherical surface)
$d_4 = D_1$ (variable)
$r_4 = 35.3904$
$d_5 = 6.1705$   $n_3$ (GRIN lens $G_1$)
$r_6 = 46.0826$
$d_6 = 4.2267$
$r_7 = \infty$ (stop)
$d_7 = 6.7524$
$r_8 = -59.2165$
$d_8 = 6.8626$   $n_4$ (GRIN lens $G_2$)
$r_9 = -128.3357$
$d_9 = D_2$ (variable)
$r_{10} = -34.2443$ (aspherical surface)
$d_{10} = 5.4000$   $n_5 = 1.67270$   $\nu_5 = 32.10$ -continued

Embodiment 3

$r_{11} = -26.3212$
$d_{11} = 3.8164$
$r_{12} = -36.4872$
$d_{12} = 2.0000$   $n_6 = 1.81600$   $\nu_6 = 46.62$
$r_{13} = -88.6752$ aspherical surface coefficients

(4th surface)   $P = 0.4988$, $A_4 = -0.14095 \times 10^{-5}$
                $A_6 = -0.45252 \times 10^{-8}$
(10th surface)  $P = 1.2286$, $A_4 = -0.12657 \times 10^{-5}$
                $A_6 = 0.90267 \times 10^{-9}$
$A_8$ and latter terms: 0

| f | 50 | 70 | 100 |
|---|---|---|---|
| $D_1$ | 28.608 | 18.105 | 1.600 |
| $D_2$ | 34.093 | 8.536 | 3.000 |

GRIN lens

| | | $N_0$ | $N_1$ |
|---|---|---|---|
| $G_1$ | d line | 1.72000 | $-0.14011 \times 10^{-2}$ |
| | C line | 1.71568 | $-0.14011 \times 10^{-2}$ |
| | F line | 1.73001 | $-0.14012 \times 10^{-2}$ |
| | | $N_2$ | $N_3$ |
| | d line | $-0.18931 \times 10^{-5}$ | $-0.28293 \times 10^{-8}$ |
| | C line | $-0.18931 \times 10^{-5}$ | $-0.28293 \times 10^{-8}$ |
| | F line | $-0.18931 \times 10^{-5}$ | $-0.28293 \times 10^{-8}$ |
| | | $N_0$ | $N_1$ |
| $G_2$ | d line | 1.72000 | $-0.58409 \times 10^{-3}$ |
| | C line | 1.71568 | $-0.58409 \times 10^{-3}$ |
| | F line | 1.73001 | $-0.58409 \times 10^{-3}$ |
| | | $N_2$ | $N_3$ |
| | d line | $0.23383 \times 10^{-5}$ | $0.46865 \times 10^{-8}$ |
| | C line | $0.23383 \times 10^{-5}$ | $0.46865 \times 10^{-8}$ |
| | F line | $0.23383 \times 10^{-5}$ | $0.46865 \times 10^{-8}$ |

Embodiment 4

$f = 50 \sim 100$, $F/4.5 \sim F/7.8$
maximum image height 21.6
field angle $2\omega = 48.8° \sim 24.3°$ $r_1 = 52.6731$
$d_1 = 12.3896$   $n_1$ (GRIN lens $G_1$)
$r_2 = 45.3213$
$d_2 = D_1$ (variable)
$r_3 = 21.8448$
$d_3 = 5.0755$   $n_2 = 1.77250$   $\nu_2 = 49.66$
$r_4 = 65.6785$
$d_4 = 0.2000$
$r_5 = 14.5670$
$d_5 = 1.4000$   $n_3 = 1.72825$   $\nu_3 = 28.46$
$r_6 = 10.7026$
$d_6 = 5.2680$
$r_7 = \infty$ (stop)
$d_7 = 5.0659$
$r_8 = -13.0453$
$d_8 = 1.2000$   $n_4 = 1.72825$   $\nu_4 = 28.46$
$r_9 = -204.1648$
$d_9 = 4.0054$   $n_5 = 1.77250$   $\nu_5 = 49.66$
$r_{10} = -14.9002$
$d_{10} = 0.2000$
$r_{11} = 1067.4048$
$d_{11} = 2.9123$   $n_6 = 1.77250$   $\nu_6 = 49.66$
$r_{12} = -51.3690$
$d_{12} = D_2$ (variable)
$r_{13} = -89638.8974$
$d_{13} = 12.5631$   $n_7$ (GRIN lens $G_2$)
$r_{14} = -165.5729$

| f | 50 | 70 | 100 |
|---|---|---|---|
| $D_1$ | 22.365 | 14.285 | 1.000 |
| $D_2$ | 24.735 | 10.238 | 1.000 |

GRIN lens

| | | $N_0$ | $N_1$ |
|---|---|---|---|
| $G_1$ | d line | 1.64769 | $0.24138 \times 10^{-3}$ |
| | C line | 1.64191 | $0.24138 \times 10^{-3}$ |
| | F line | 1.66108 | $0.24138 \times 10^{-3}$ |
| | | | $N_2$ |

-continued

Embodiment 4

|  |  | d line | 0.14997 × 10⁻⁶ |  |
|---|---|---|---|---|
|  |  | C line | 0.14997 × 10⁻⁶ |  |
|  |  | F line | 0.14997 × 10⁻⁶ |  |
|  |  |  | $N_0$ | $N_1$ |
| $G_2$ |  | d line | 1.64769 | 0.67578 × 10⁻³ |
|  |  | C line | 1.64191 | 0.67578 × 10⁻³ |
|  |  | F line | 1.66108 | 0.67578 × 10⁻³ |
|  |  |  | $N_2$ |  |
|  |  | d line | 0.68677 × 10⁻⁷ |  |
|  |  | C line | 0.68677 × 10⁻⁷ |  |
|  |  | F line | 0.68677 × 10⁻⁷ |  | wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denotes the refractive indices of the respective lens elements, and the reference symbols $\nu_1, \nu_2, \ldots$ represent the Abbe's numbers of the respective lens elements.

Figure 2:
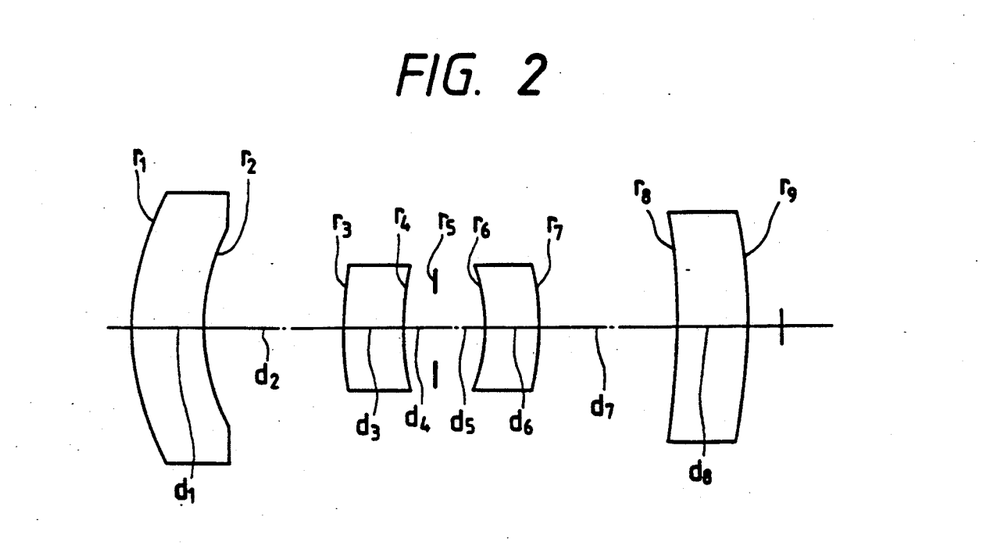
FIG. 2 through FIG. 4 show sectional views illustrating composition of Embodiment 1 of the vari-focal lens system according to the present invention.
Figure 3:
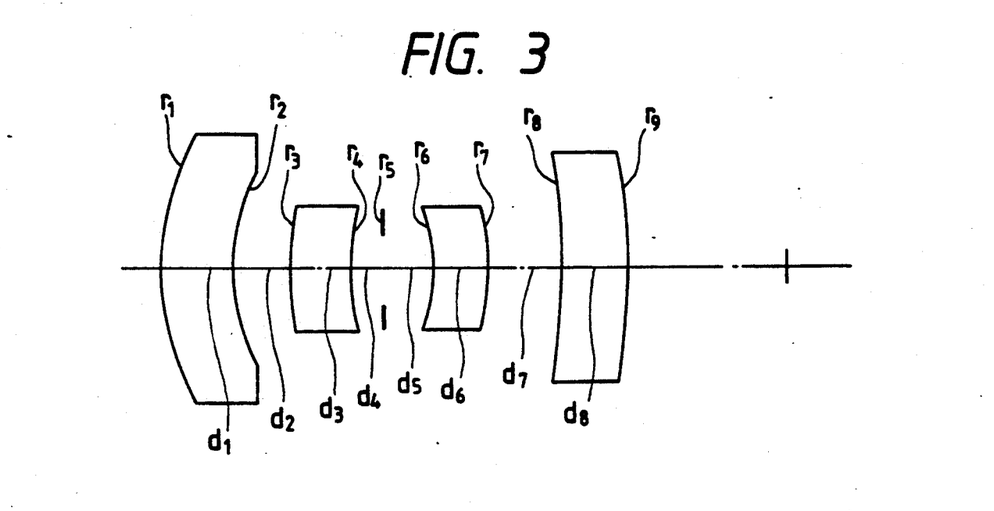
Figure 4:
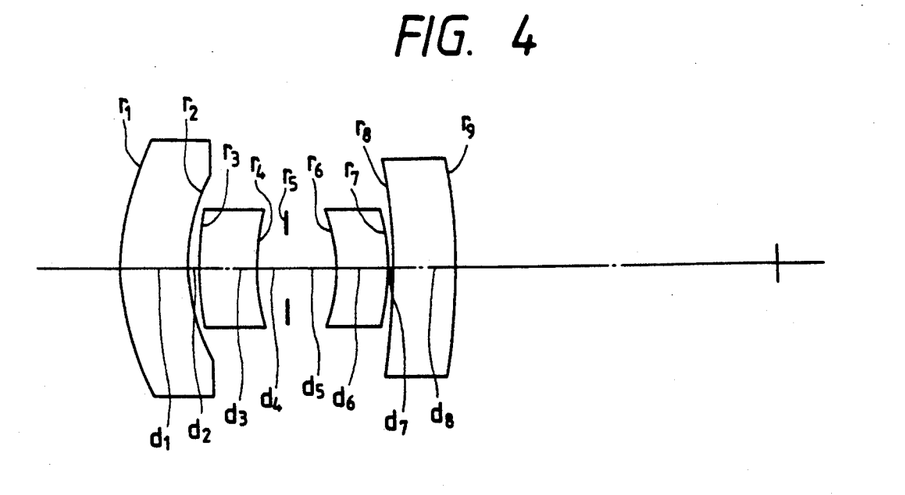

Embodiment 1 has the composition which is set at the wide position, intermediate focal length and tele position as illustrated in FIG. 2, FIG. 3 and FIG. 4 respectively. Embodiment 1 comprises, in order from the object side, a first lens unit having a negative refractive power, a second lens unit having a positive refractive power, an aperture stop, a third lens unit having a positive refractive power and a fourth lens unit having a negative refractive power. Each of the lens units is composed of a single radial GRIN lens element and the vari-focal lens system as a whole comprises four lens elements in total. This vari-focal lens system is adapted to perform variation of focal length by varying the airspace reserved between the first lens unit and the second lens unit as well as the airspace reserved between the second lens unit and the third lens unit. At each position within the vari-focal range, the lens units are arranged symmetrically with regard to the aperture stop and concentrically with one other so that aberrations are corrected favorably with the lens elements in the number as small as four in the vari-focal lens system.

Figure 14:
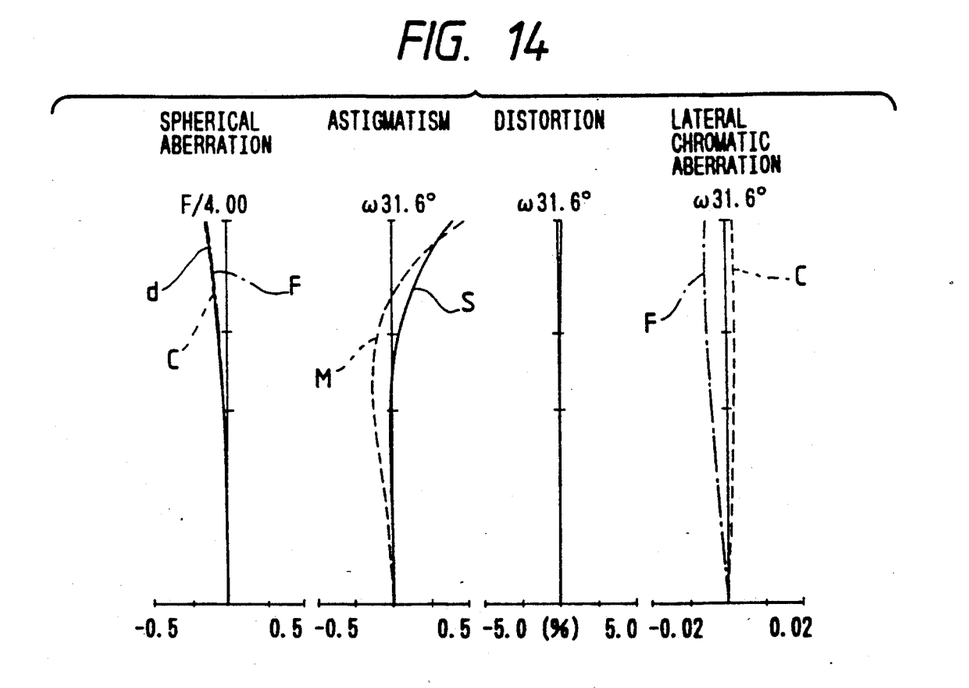
FIG. 14 through FIG. 16 show graphs illustrating aberration characteristics of Embodiment 1 of the present invention.
Figure 15:
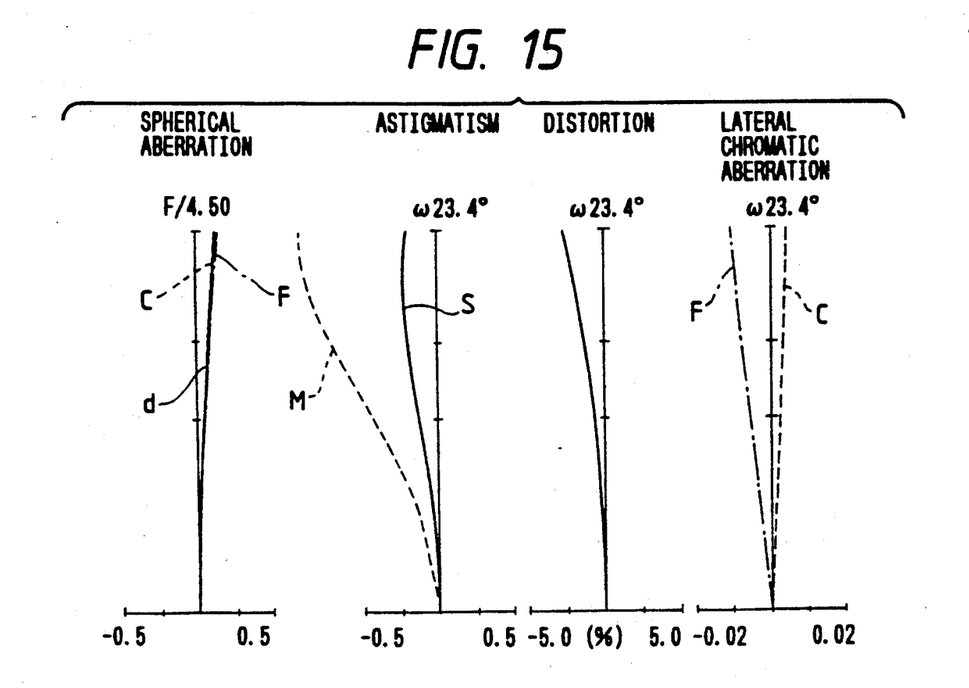
Figure 16:
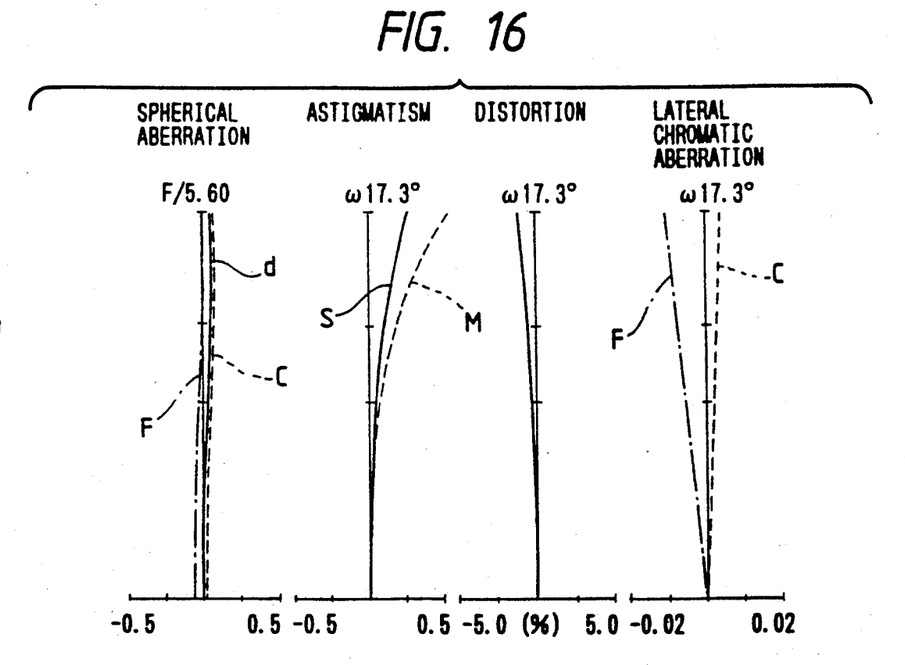

Aberration characteristics at the wide position, intermediate focal length and tele position of the Embodiment 1 for an object located at infinite distance are illustrated in FIG. 14, FIG. 15 and FIG. 16 respectively.

Figure 5:
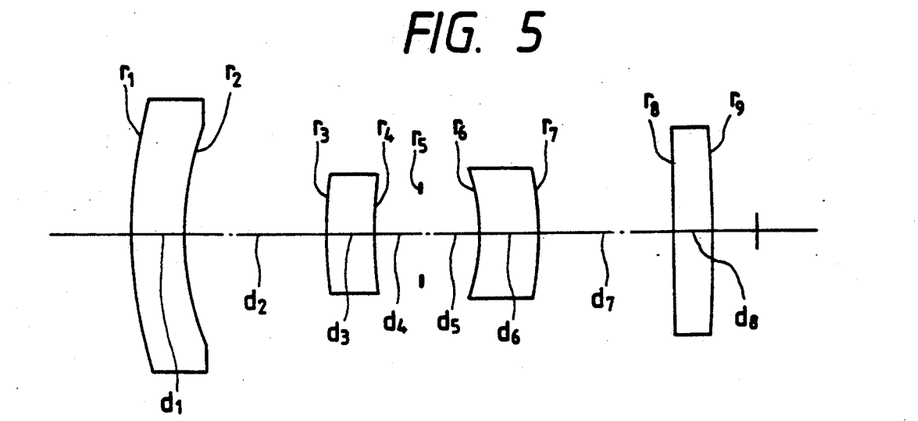
FIG. 5 through FIG. 7 show sectional views illustrating composition of Embodiment 2 of the present invention.
Figure 6:
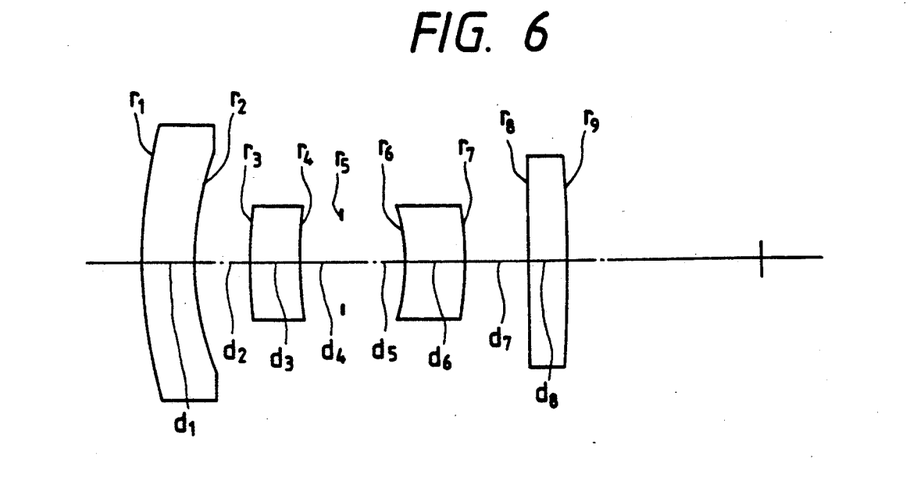
Figure 7:
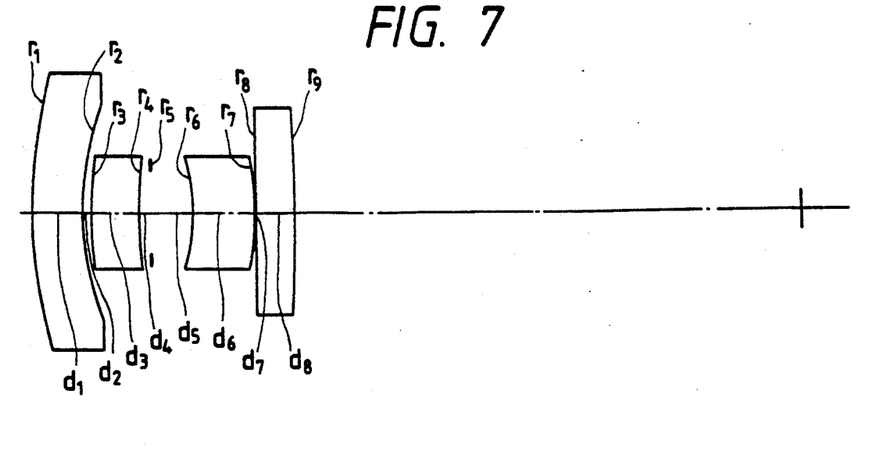

Embodiment 2 has the composition which is set at the wide position, intermediate focal length and tele position as illustrated in FIG. 5, FIG. 6 and FIG. 7 respectively.

Embodiment 2 comprises four lens units each is composed of a single radial GRIN lens element. Therefore, Embodiment 2 is designed as a vari-focal lens system consisting as a whole of four lens elements. This vari-focal lens system is adapted so as to perform variation of focal length by varying mainly the airspace reserved between the first lens unit and the second lens unit as well as the airspace reserved between the third lens unit and the fourth lens unit, and slightly varying the airspace reserved between the second lens unit and the aperture stop as well as the airspace reserved between the aperture stop and the third lens unit. By slightly varying the airspaces reserved between the second lens unit and the third lens unit as described above, Embodiment 2 prevents astigmatism from being varied by the variation of focal length and corrects the other aberrations more favorably.

Figure 17:
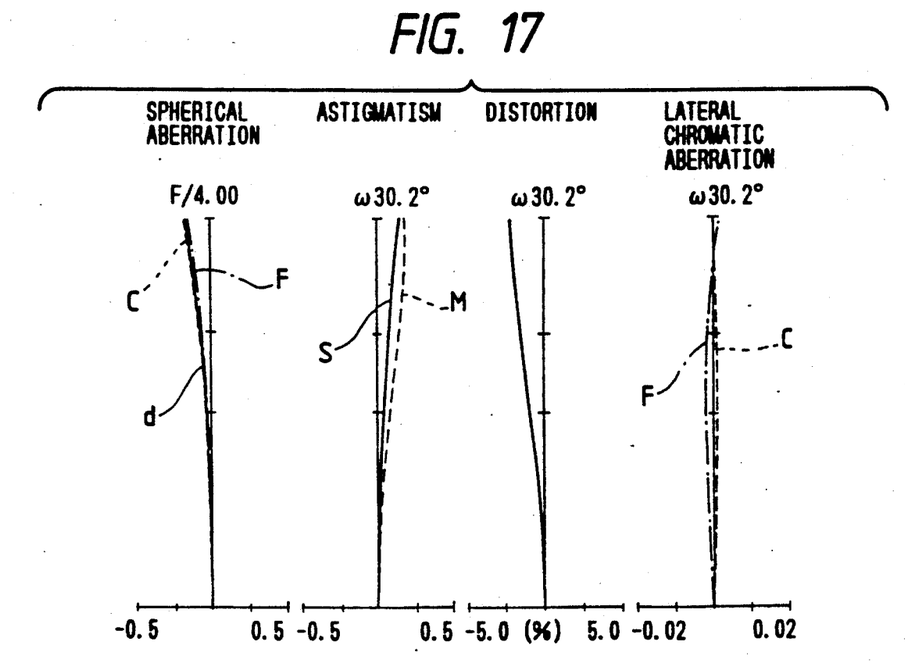
FIG. 17 through FIG. 19 show graphs illustrating aberration characteristics of Embodiment 2 of the present invention.
Figure 18:
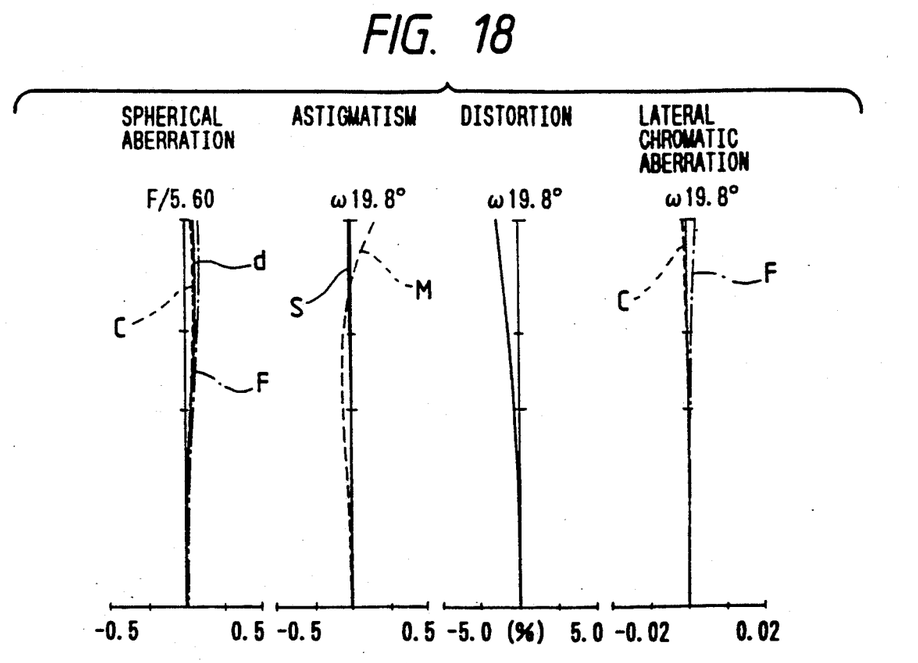
Figure 19:
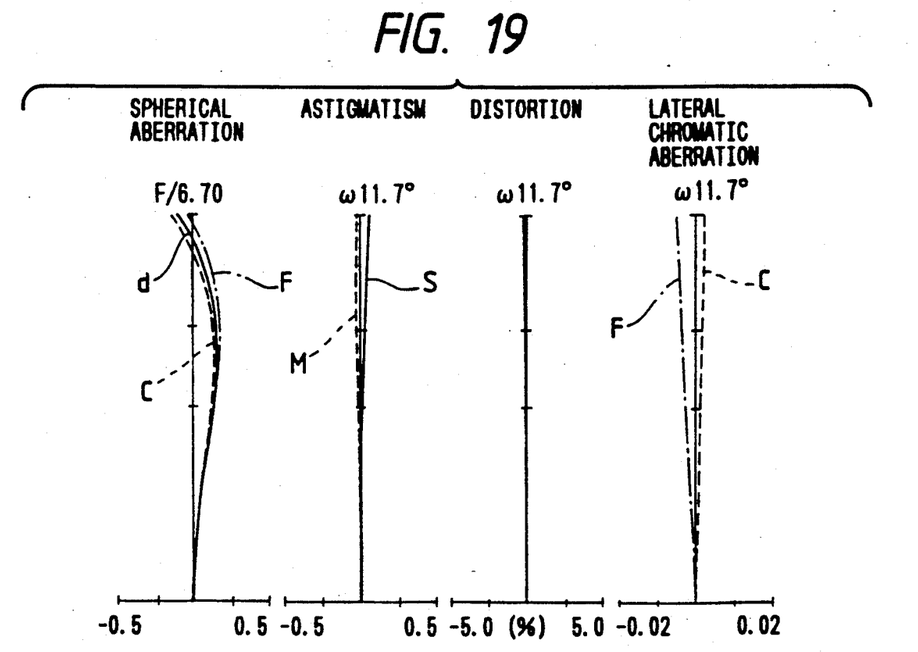

Aberration characteristics at the wide position, intermediate focal length and tele position of Embodiment 2 for an object located at infinite distance are illustrated in FIG. 17, FIG. 18 and FIG. 19 respectively.

Figure 8:
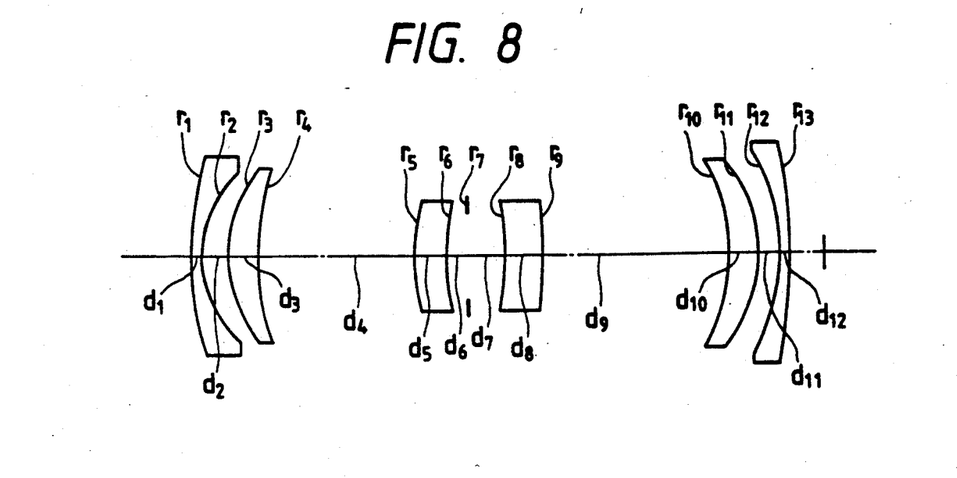
FIG. 8 through FIG. 10 show sectional views illustrating composition of Embodiment 3 of the present invention.
Figure 9:
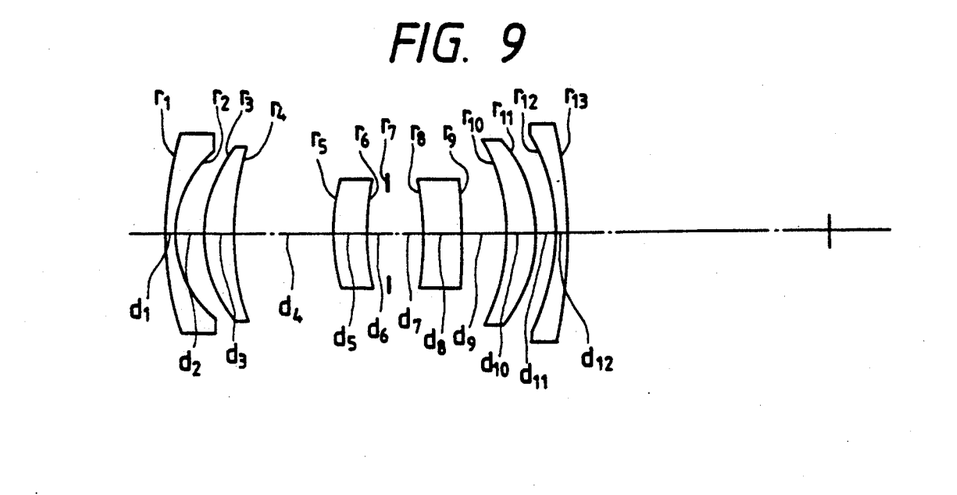
Figure 10:
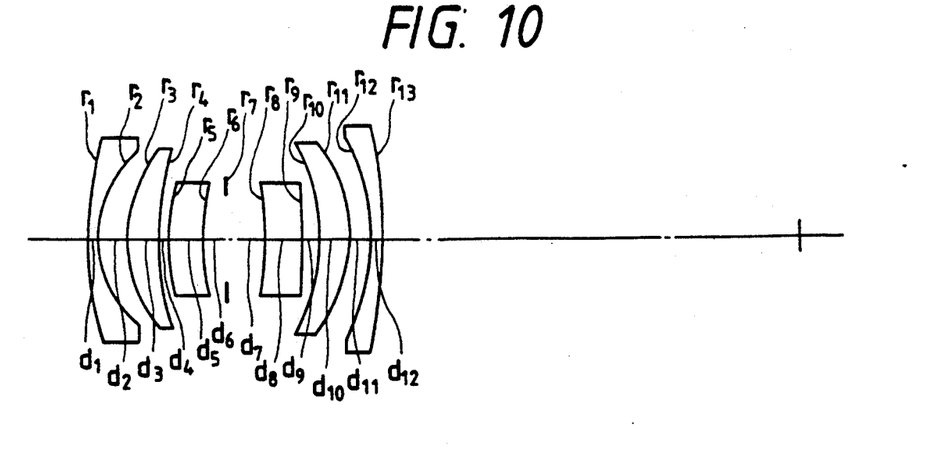

Embodiment 3 has the composition which is set at the wide position, intermediate focal length and tele position as illustrated in FIG. 8, FIG. 9 and FIG. 10 respectively. In the Embodiment 3, each of the second lens unit and the third lens unit is composed of a single radial GRIN lens element, whereas each of the first lens unit and the fourth lens unit is composed of two homogenous lens elements. Further, an aspherical surface is used in each of the first lens unit and the fourth lens unit.

When the intersection between the optical axis and the aspherical surface is taken as the origin, the direction of the optical axis is taken as the x axis and the direction perpendicular to the optical axis is taken as the y axis, the shape of said aspherical surface is expressed by the following formula:

$$x = \frac{y^2/r}{1 + \sqrt{1 - p(y/r)^2}} + A_4 y^4 + A_6 y^6 + \ldots$$

wherein the reference symbol r represents the radius of curvature on the reference sphere of said aspherical surface, the reference symbol p designates the conical constant, and the reference symbols $A_4$, $A_6$, denote the aspherical surface coefficients.

Embodiment 3 is adapted so as to perform variation of focal length by varying the airspace reserved between the first lens unit and the second lens unit as well as that reserved between the third lens unit and the fourth lens unit.

Figure 20:
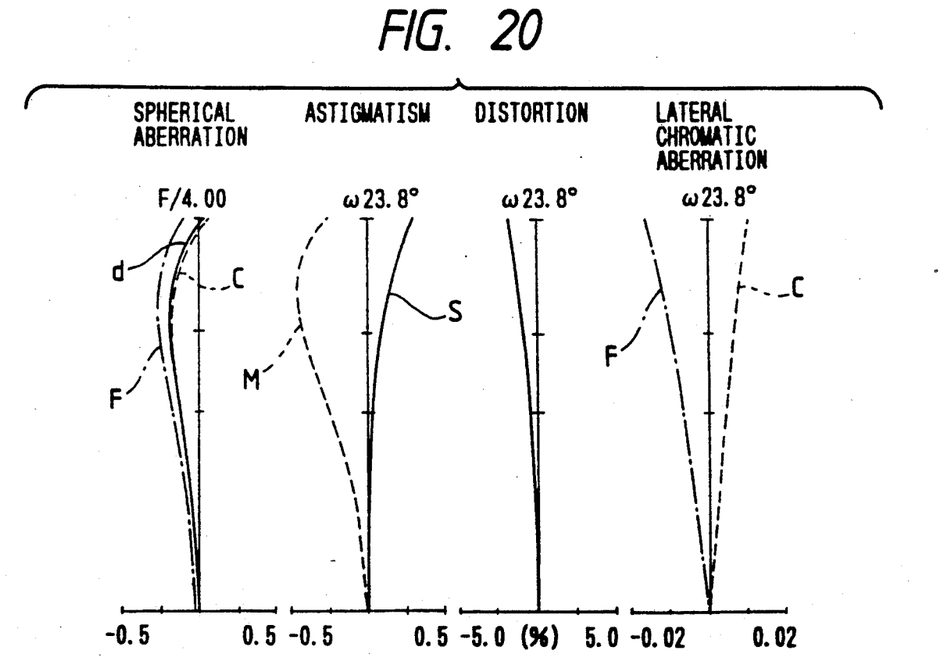
FIG. 20 through FIG. 22 show curves illustrating aberration characteristics of Embodiment 3 of the present invention.
Figure 21:
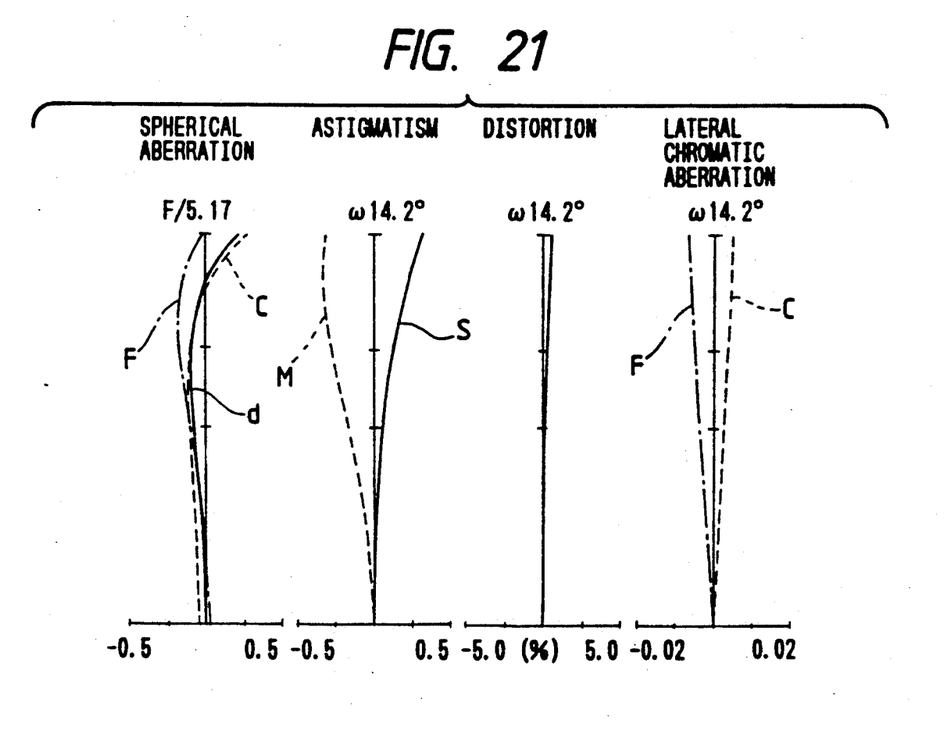
Figure 22:
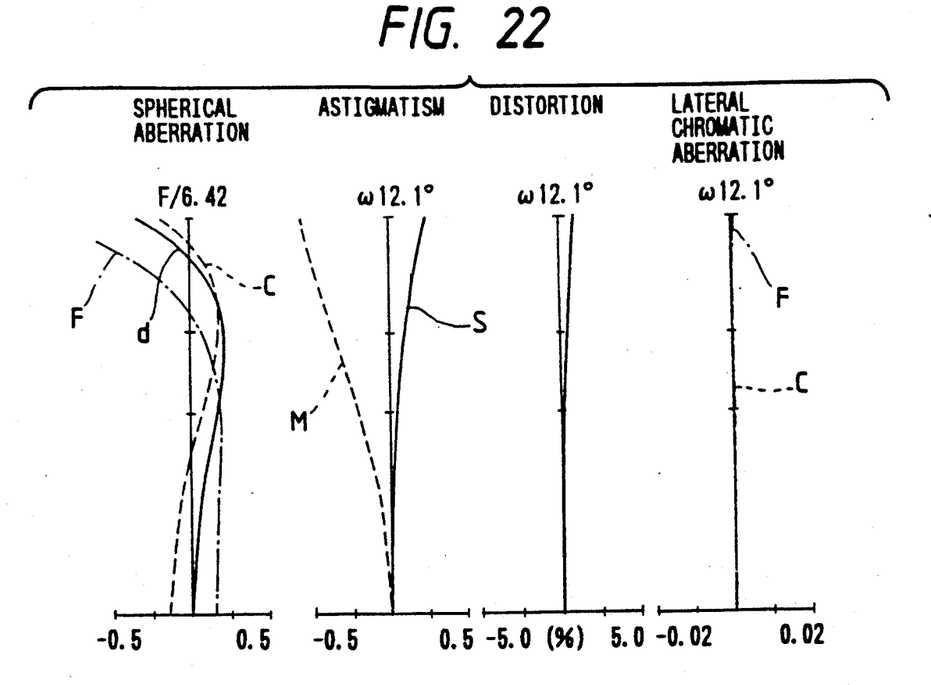

Aberration characteristics at the wide position, intermediate focal length and tele position of Embodiment 3 for an object located at infinite distance are visualized in FIG. 20, FIG. 21 and FIG. 22 respectively.

Figure 11:
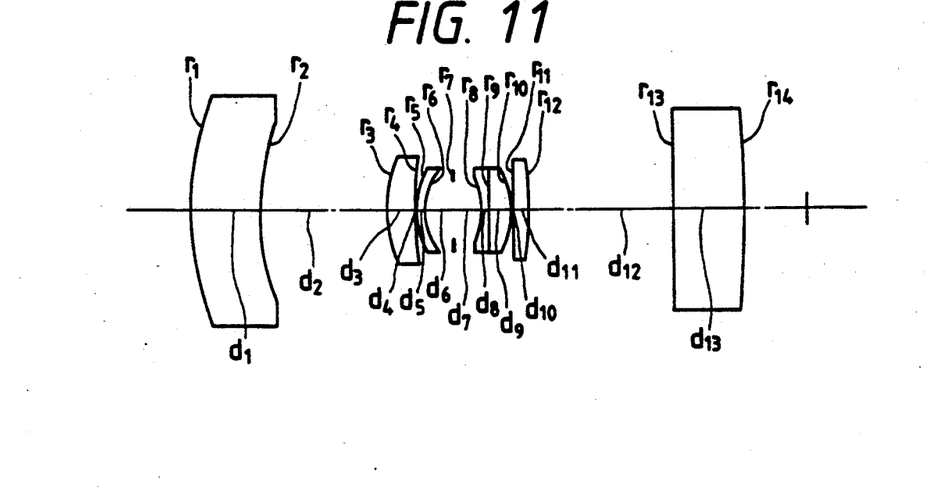
FIG. 11 through FIG. 13 show sectional views illustrating composition of Embodiment 4 of the present invention.
Figure 12:
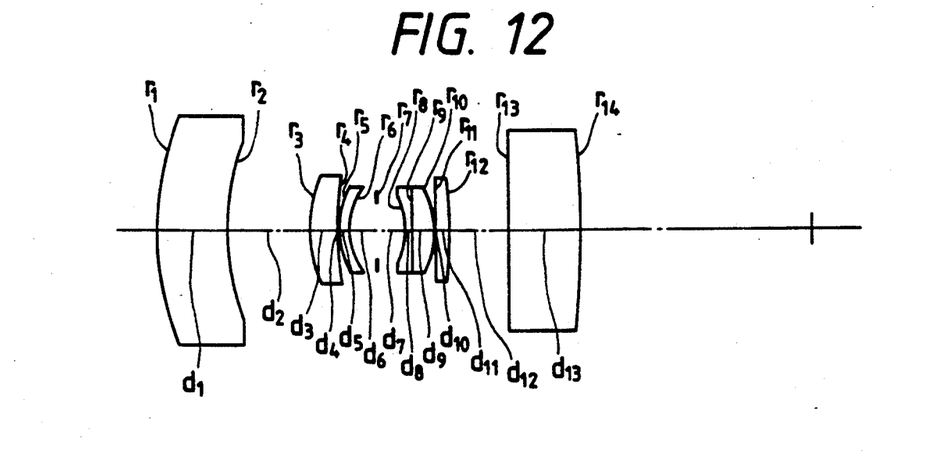
Figure 13:
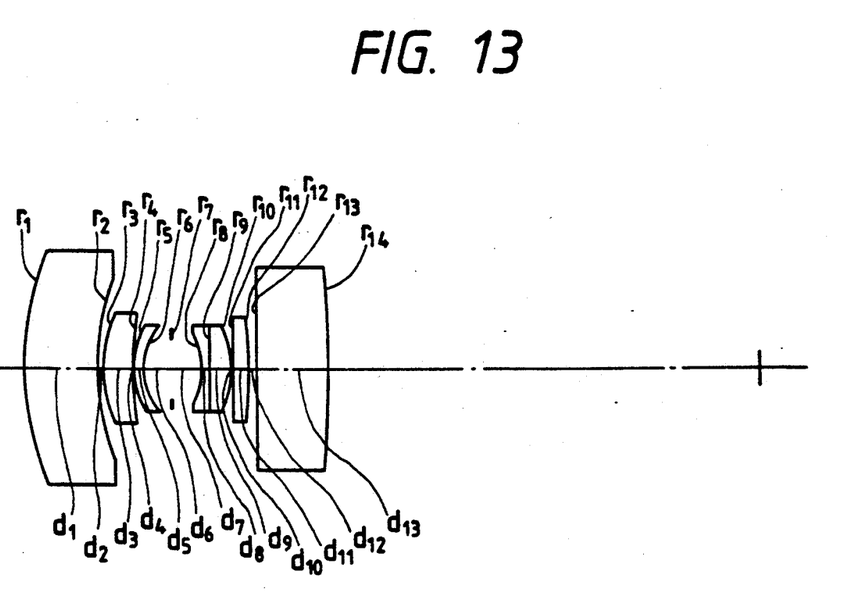

The Embodiment 4 has the composition which is illustrated in FIG. 11, FIG. 12 and FIG. 13 at the wide position, intermediate focal length and tele position respectively of the vari-focal lens system. In the Embodiment 4, each of the first lens unit and the fourth lens unit is composed of a single radial GRIN lens element, whereas the second lens unit is composed of two homogenous lens elements and the third lens unit consists of three homogenous lens elements.

Figure 23:
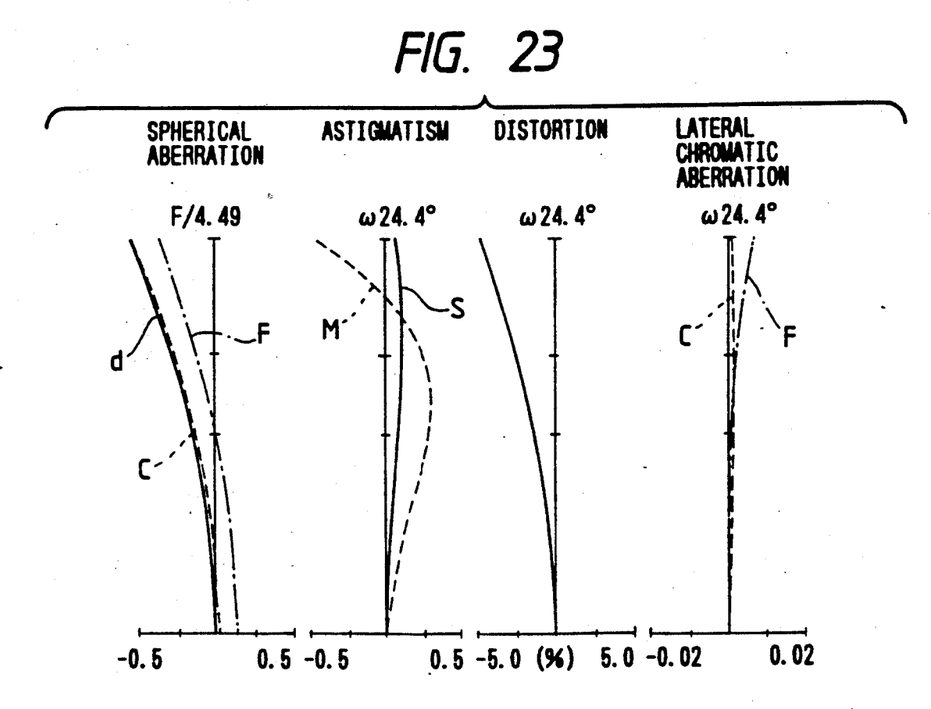
FIG. 23 through FIG. 25 show curves illustrating aberration characteristics of Embodiment 4 of the present invention.
Figure 24:
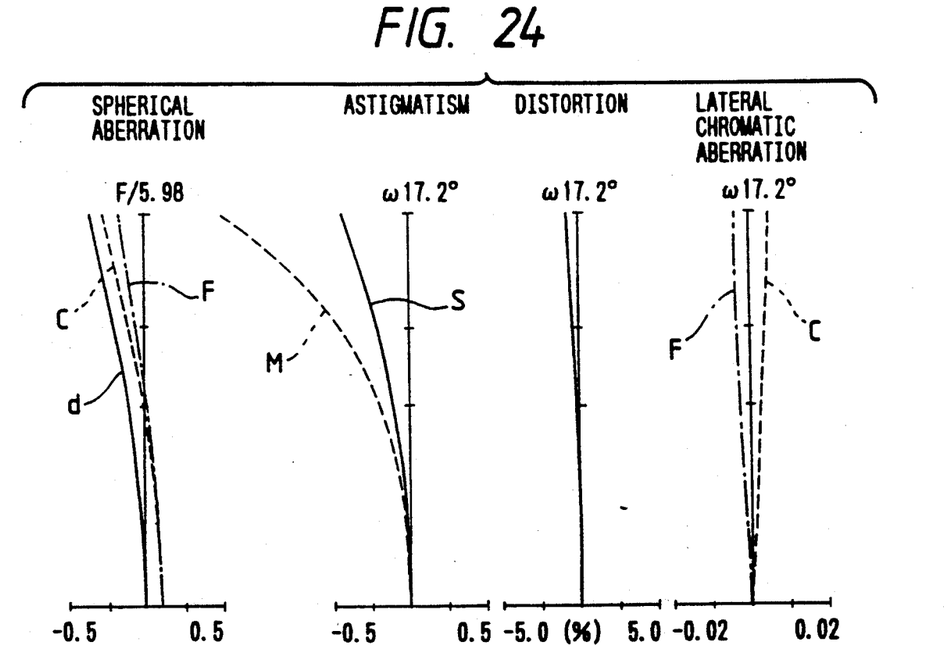
Figure 25:
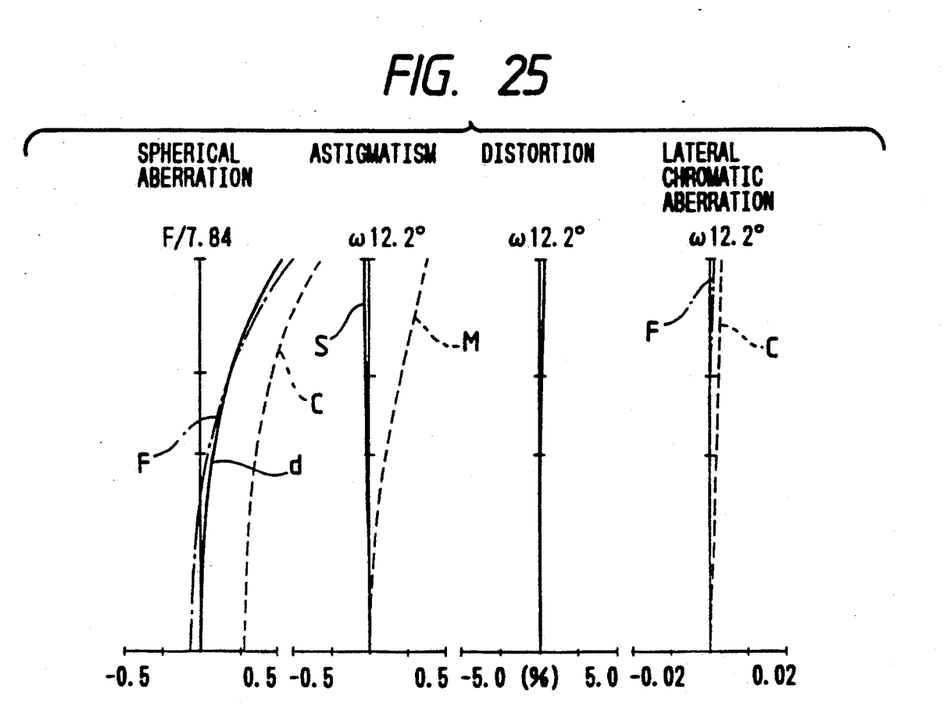

Aberration characteristics at the wide position, intermediate focal length and tele position of the Embodiment 4 for an object located at infinite distance are illustrated in FIG. 23, FIG. 24 and FIG. 25 respectively.

As is understood from the foregoing description, the vari-focal lens system according to the present invention is designed for use with cameras, etc., comprises a very small number of lens elements and has favorably corrected aberrations.

We claim:

1. A vari-focal lens system comprising, in order from the object side;
    a first lens unit having a negative refractive power,
    a second lens unit having a positive refractive power,
    an aperture stop,
    a third lens unit having a positive refractive power, and
    a fourth lens unit having a negative refractive power, wherein at least one radial type graded refractive index lens element is disposed before said aperture stop and at least one radial type graded refractive index lens element is disposed after said aperture stop, and wherein said vari-focal lens system varies focal length thereof by varying at least an airspace disposed between said first lens unit and said second lens unit as well as an airspace disposed between said third lens unit and said fourth lens unit.

2. The vari-focal lens system according to claim 1 wherein each of said first through fourth lens units comprises a radial GRIN lens element.

3. The vari-focal lens system according to claim 1 wherein each of said second lens unit and said third lens unit comprises a radial GRIN lens element.

4. The vari-focal lens system according to claim 3 wherein each of said first lens unit and said fourth lens unit comprises a homogeneous lens element having an aspherical surface.

5. The vari-focal lens system according to claim 1 wherein each of said first lens unit and said fourth lens unit comprises a radial GRIN lens element.

6. The vari-focal lens system according to claim 1, 2, 3 or 4 wherein each of said lens units comprising the radial GRIN lens elements consists of a single lens element.

7. The vari-focal lens system according to claim 6 wherein each of said lens elements has a shape concave toward said aperture stop.

8. A vari-focal lens system comprising, in order from the object side:
a first lens unit having a negative refractive power,
a second lens unit having a positive refractive power,
an aperture stop,
a third lens unit having a positive refractive power, and
a fourth lens unit having a negative refractive power,
wherein at least one radial type graded refractive index lens element is disposed before said aperture stop and at least one radial type graded refractive index lens element is disposed after said aperture stop,
wherein each of said second lens unit and said third lens unit comprises a radial graded refractive index lens element, and
wherein each of said first lens unit and said fourth lens unit comprises a homogeneous lens element having an aspherical surface.

* * * * *